United States Patent [19]

Lopes

[11] Patent Number: 5,022,633
[45] Date of Patent: Jun. 11, 1991

[54] ONE-HANDED CAM ACTION FISH TAPE PULLER

[76] Inventor: Edward L. Lopes, 466 N. Richard, Orange, Calif. 92667

[21] Appl. No.: 436,892

[22] Filed: Nov. 15, 1989

[51] Int. Cl.$^5$ .............................................. B65H 59/00
[52] U.S. Cl. ........................... 254/134.3 FT; 294/114; 81/300
[58] Field of Search ............... 254/134.3 R, 134.3 PT, 254/245, 250, 254, 256, 259; 269/3, 6, 231, 236; 81/177.3, 300; 30/111, 112, 232, 291, 298; 294/113, 114

[56] References Cited

U.S. PATENT DOCUMENTS 1,939,187  2/1932  Patterson .............................. 81/487
4,746,099  5/1988  Lopes ......................... 254/134.3 FT

*Primary Examiner*—D. S. Meislin
*Attorney, Agent, or Firm*—William L. Chapin

[57] ABSTRACT

A tool which can be held and manipulated in one hand, for grasping and pulling steel fish tapes of the type used to pull electrical wires through building walls comprises two identical handle members having flat and parallel front and rear surfaces. Each handle member has a convex inner transverse wall surface, and a notch cut forward from the rear wall surface behind the convex transverse wall surface to a flat longitudinal plane located approximately midway between the front and rear wall surfaces, the notch terminating in an inner transverse wall plane which serves as an anvil plane. Two handle members are pivotably joined by a pivot pin with their bottom longitudinal notch walls in sliding contact, such that a space for receiving a fish tape is provided between each convex inner transverse wall surface of a handle member and the adjacent anvil plane of the other handle member. The convex transverse wall surface is eccentrically located with respect to the pivot pin, such that pivoting the two handle members out of longitudinal alignment decreases the space between anvil plane and transverse wall surface, gripping the fish tape securely between the two surfaces.

4 Claims, 2 Drawing Sheets

ONE-HANDED CAM ACTION FISH TAPE PULLER

FIELD OF THE INVENTION.

This invention relates to tools for manipulating thin, elongated steel strips or tapes. More particularly, the invention relates to tools which are useful for gripping and pulling steel leader tapes, referred to as fish tapes, which are temporarily attached to electrical wires and then used to pull the wires through passageways behind building walls.

DESCRIPTION OF BACKGROUND ART.

Fish tapes are flexible steel tapes available in various lengths and used to "fish" attached electrical wires through walls and floors of structures in which new electrical wiring is being installed. A typical fish tape has a hook at one end adapted to attachment to the end of an electrical wire. The hooked end of the tape is inserted into the opening of a conduit or other passageway through which is it desired to string an electrical cable. The tape is then fed into the conduit by pushing on the slack end, until the hook emerges from the conduit. The hook is then attached to the end of the electrical cable. After the hook has been attached to the end of the cable, a pulling force is applied to the opposite end of the tape, pulling the tape and attached cable through the conduit.

Typical fish tapes are ¼" to 5/16" wide, about 1/16" thick, and are supplied in reels containing 100 or 200 feet of tape. Frequently, substantial frictional resistance is encountered between the surfaces of the electrical wires and the walls of the conduits or passageways through which the wires are being pulled. Overcoming this frictional resistance makes it necessary to exert a large tensile force on the free end of the fish tape in pulling the wire all the way through the passageway.

Since it is difficult to exert a large pulling force on the free end of a fish tape with bare hands, pliers are sometimes used to grasp the free end of the fish tape to permit application of a larger pulling force. However, in practice, the jaws of the pliers frequently slip off of and damage the fish tape. Thus, the use of pliers provides a less than satisfactory solution to the problem of exerting a large pulling force on the fish tape.

In an effort to improve upon the pliers as a tool for pulling fish tapes, various tools have been devised. These include tools disclosed in the following U.S. patents:

Goodall, U.S. Pat. No. 1,880,431, Oct. 4, 1932, Tool For Forcing and Drawing an Element Through Conduits; Patterson, U.S. Pat. No. 1,939,187, Dec. 12, 1933, Fish Tape Puller; Hughes, U.S. Pat. No. 2,736,532, Feb. 28, 1956, Tool For Pushing or Pulling Fish Tape Through a Conduit; Ehrens, U.S. Pat. No. 3,763,722, Oct. 9, 1973, Gripping and Pulling Tool for Retracting Guide Tapes From Conduit While Pulling Electrical Wires Into the Conduit.

"Lopes, U.S. Pat. No. 4,746,099, May 24, 1988, Cam Action Fish Tape Puller present inventor disclosed an improved fish tape puller using cam action jaws. The present invention was conceived of to provide an improved fish tape puller which can be operated with a single hand.

OBJECTS OF THE INVENTION

An object of the present invention is to provide a fish tape pulling tool which can be manipulated using only one hand.

Another object of the present invention is to provide a tool capable of exerting a large pulling force on a fish tape without damaging it.

Another object of the invention is to provide a fish tape pulling tool which can produce a uniform pulling force on a fish tape, thereby minimizing the possibility of kinking the fish tape.

Another object of the invention is to provide a fish tape pulling tool having a minimum number of parts, thereby minimizing the cost of fabrication of the tool.

Another object of this invention is to provide a fish tape pulling tool having a pair of substantially identical parts, thereby minimizing the cost of manufacturing the tool.

Another object of the invention is to provide a fish tape pulling tool which is simply and easily operated.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved tool for gripping and pulling a steel fish tape. The improved fish tape puller according to the present invention has two identical, generally flat members of uniform thickness. Each identical handle member has in plan view a generally flat upper wall surface, and curvilinear outer and lower wall surfaces, each having an indentation. The two handle members are pivotably joined to one another by means of a pivot pin disposed perpendicularly to the thickness dimension of the handle members. The pivot pin is located on the common longitudinal center line of the two handle members, a slight distance back from the inner wall surface of the handle member.

Each handle member has a convex inner wall surface near the pivot pin. One flat, rear planar surface of each handle member has a notch cut downward into the surface. The notch has a flat, vertical transverse surface forming a flat anvil plane disposed perpendicularly to the longitudinal axis of the handle member and displaced longitudinally outwards from the pivot pin. The notch is cut downwards approximately halfway through the thickness dimension of the handle member, and has a flat longitudinal wall surface parallel to the front and rear wall surfaces of the jaw member.

The two handle members are joined with their bottom flat notch-wall surfaces in sliding contact. Thus positioned, the convex front or inner surface of each handle member is eccentrically disposed with respect to the axis of the pin, thereby serving as a cam surface. Pivoting the handle members out of longitudinal alignment causes each convex front cam surface to move closer to an adjacent anvil plane sufficiently to grip a fish tape between the front cam surface and the anvil plane. The indentations in the outer and lower edge walls of the handle members are adapted to engagement by the fingers of a single handle. Also, the handle members are relatively short, permitting the tool to be held in a single hand with the handle members in a longitudinal alignment, while a fish tape is inserted between a cam surface and adjacent anvil plane on either side of the tool. Then, the handle members can be pivoted upwards to narrow the space between the cam surface and anvil plane, gripping the fish tape therebetween. Thus, by using the tool according to the present invention, a fish tape may be engaged, gripped and pulled, all while holding the tool in a single hand.

DETAILED DESCRIPTION OF THE INVENTION

Figure 1:
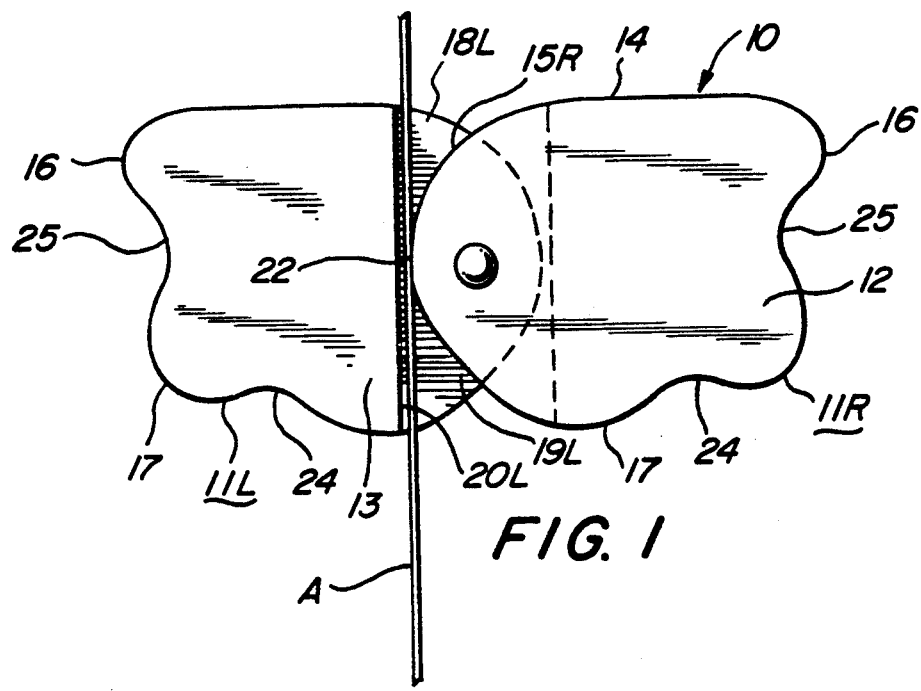
FIG. 1 is a front elevation view of the one-handed cam action fish tape puller according to the present invention, showing the tool in an open position with a fish tape inserted into the tool.

Referring now to FIGS. 1 through 4, a one-handed cam action fish tape puller according to the present invention is shown. As shown in the Figures, the tool 10 includes left and right half handle members 11 which are identical. Each identical handle member 11 of tool 10 may be visualized as being formed from a block of uniform thickness material having flat and parallel front and rear wall surfaces 12 and 13, respectively. The cross-sectional shape of each handle member 11, as shown in the front elevation view of FIG. 1, is that of an irregular polygon having curved sides walls, the details of which side walls are described below. As a rough approximation, the cross-sectional shape of each handle member 11 may be described as a slightly horizontally elongated, quasi-rectangular shaped body having a generally flat upper edge wall surface 14, a convex inner edge wall surface 15, a concave, indented outer edge wall surface 16, and a concave, indented lower edge wall surface 17.

Figure 2:
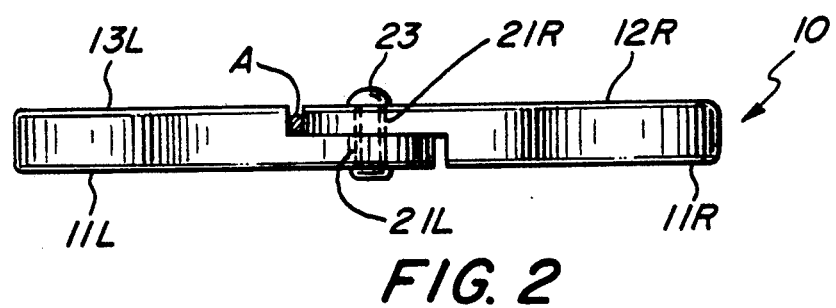
FIG. 2 is a lower plan view of the tool of FIG. 1.
Figure 3:
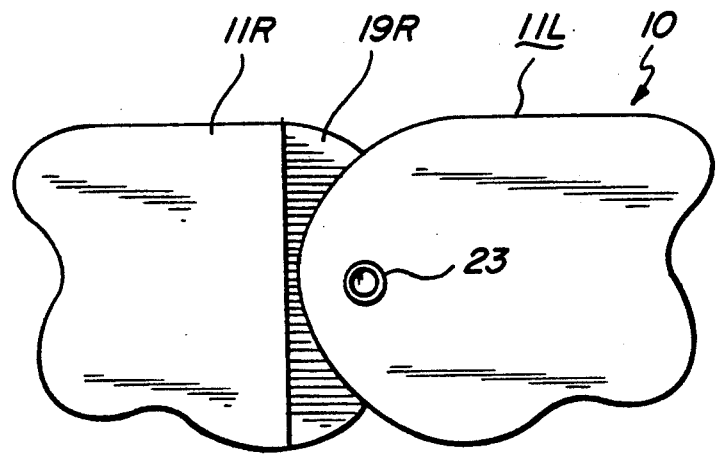
FIG. 3 is a rear elevation view of the tool of FIG. 1.

As shown in FIGS. 1 through 3, that portion of the rear wall surface 13 of each handle member 11 near convex inner edge wall 15 is cut away or relieved by a notch 18 which extends perpendicularly inwards from the rear wall surface to a parallel recessed longitudinal plane 19 located approximately half way through the thickness dimension of the handle member. Notch 18 extends from the inner edge wall 15 of handle member 11 longitudinally a distance of approximately one-third the length of the handle member, terminating in a vertically disposed transverse wall surface 20 which spans the width of the handle member and which extends perpendicularly forward from the recessed longitudinal plane 19.

As shown in FIGS. 1-3, two identical handle members 11 are pivotably joined together to comprise tool 10. For purposes of description, one of the two identical handle members 11, 11L, is referred to as a left-hand handle member, while the other handle member is referred to as a right-hand handle member 11R. Prior to assembly of handle members 11R and 11L into tool 10, one handle member, 11R, is rotated 180 degrees about its longitudinal axis relative to handle member 11L, placing the front wall surface 12 of left-hand handle member 11L in co-planar alignment with rear wall surface 13R of right-hand handle member 11R. Similarly, the relative positioning of the two handle members 11L and 11R places the rear wall surface 13L of left-hand handle member 11L in coplanar alignment with front wall surface 12R of right-hand handle member 11R.

With left and right handle members 11L and 11R positioned as described above, the recessed longitudinal wall 19L of notch 18L is in flush contact with recessed longitudinal plane wall 19R of right-hand handle member 10R. The inner portion of each handle member 11 is provided with a through-hole 21 extending through the thickness dimension of the handle member, extending through recessed longitudinal plane wall 19 and front wall surface 12. Hole 21 is positioned approximately on the longitudinal center line of handle member 11, slightly inwards from the apex 22 of convex inner edge wall 15. A double-headed pivot pin 23 extends through holes 21L and 21R of left and right handle members 11L and 11R. Thus joined, left and right handle members 11L and 11R may be pivoted in a plane parallel to the front and rear wall surfaces 12 and 13 of the handle members, the recessed planes 19L and 19R sliding against one another.

Figure 4:
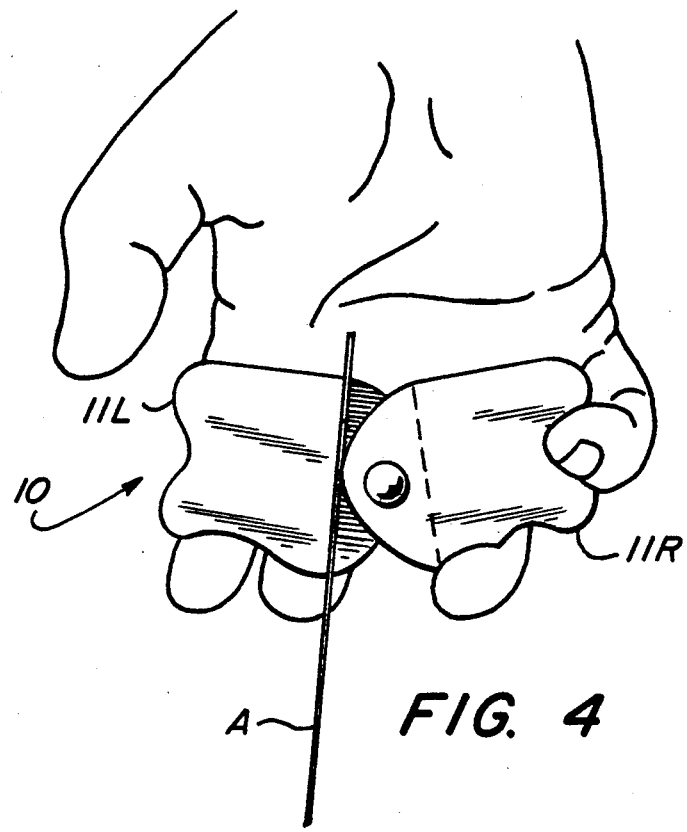
FIG. 4 is a front elevation view of the tool of FIG. 1, showing a fish tape being gripped by the tool in a closed position.

The convexly curved front wall surface 15 of each handle member 11 has an apex 22 which has a curvature which is greater than that of a circular surface. Preferably, the radius of curvature of apex 22 is also eccentrically located with respect to the pivot hole 21. Therefore, when the two handle members 11 are pivoted with respect to one another, apex 22 of each handle member approaches more closely to an adjacent transverse edge wall 20 of a notch 18. Thus, transverse edge wall 20 forms an anvil plane, allowing a fish tape A inserted between an apex 22 and anvil plane 20 to be tightly squeezed therebetween, when the two handle members are pivoted upwards out of longitudinal alignment, as shown in FIG. 4.

As shown in FIGS. 1–4, the lower edge wall 17 of handle member 11 preferably has a curvilinear concave indentation 24 adapted to provide a secure gripping surface for one or more fingers. Similarly, outer transverse edge wall 16 of each handle member 11 is preferably provided with a curvilinear indentation 25 adapted to provide a secure gripping surface for one or more fingers.

Figure 5:
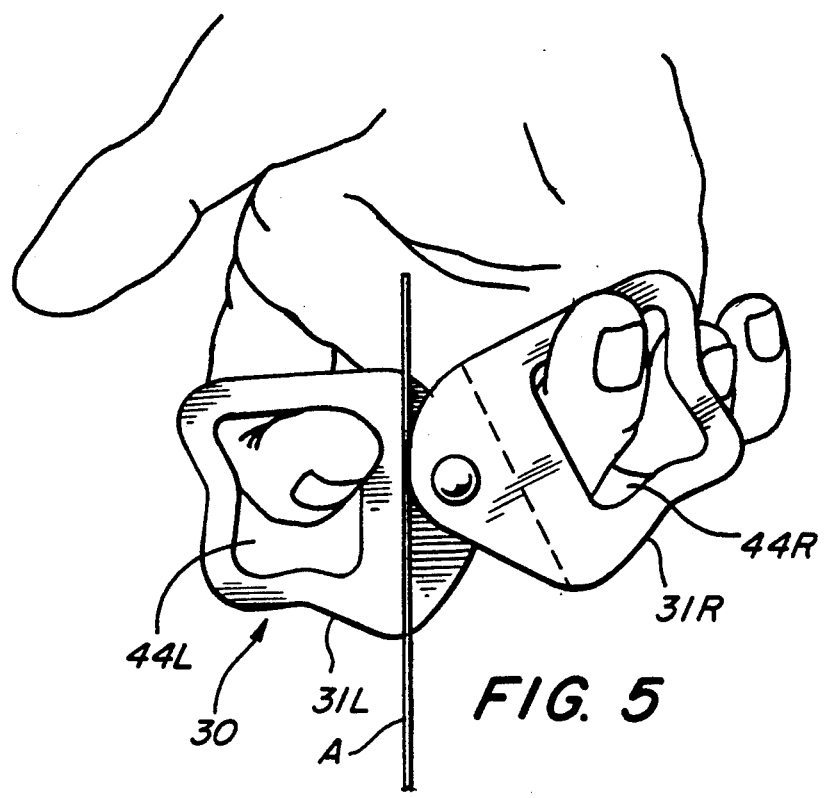
FIG. 5 is a front elevation view of an alternate embodiment of the tool of FIG. 1, showing a fish tape being gripped by the tool in a closed position.

FIG. 5 illustrates a modified version 30 of the tool 10, in which each handle member 31 is provided with an aperture 44. Apertures 44 in handle members 31 reduce the weight of tool 30, without compromising its strength. Also, as shown in FIG. 5, apertures 44 may be used as finger holes for grasping the tool handle members 31. Thus, modified tool 30 may be grasped exteriorly, as shown in FIG. 4, or interiorly, as shown in FIG. 5.

What is claimed is:

1. A tool for gripping a thin strip of material comprising;

(a) first and second handle members each having opposed front and rear wall surfaces connected together by an irregular polygonal perimeter wall extending perpendicular to said front and rear wall surfaces,
said perimeter wall having indent means on an outer portion and on a lower portion thereof for engagement by a human finger, said perimeter wall having a generally convex edge on an inner portion thereof opposed to said outer portion of said perimeter wall,
a notch cut through said convex edge and said rear wall surface, said notch being defined by a flat wall lying parallel to said front and rear wall surfaces and an inner anvil wall lying perpendicular to said flat wall;
(b) pivot means joining said first and second handle members with said convex edge of said first handle member lying adjacent said inner anvil wall of said second handle member, said flat walls of said first and second handle members being in slidable contact, said pivot means being located eccentrically with respect to said convex edges of said first and second handle members,
wherein pivoting said handle members in a plane parallel to said front and rear wall surfaces of said handle members reduces the spacing between the convex edge of each handle member and its adjacent anvil wall,
whereby a thin strip of material may be engaged, gripped, and pulled, all while holding said tool in the palm of a human hand.

2. The tool of claim 1 wherein the curvature of said convex edge is greater than that of a circle tangent to said convex edge.

3. The tool of claim 1 wherein each of said first and second handle members has an aperture cut through the thickness dimension of said handle member, said aperture being located between said anvil wall and the outer portion of said perimeter wall of said handle member, said aperture extending through said front and rear wall surfaces of said handle member and being adapted to receive a finger, whereby a finger from one human hand may be inserted into an aperture of each of said handle members, permitting application of pressure on an upper edge wall of said aperture to pivot said handle members in a longitudinal plane with respect to one another.

4. The tool of claim 1 wherein said pivot means is further defined as being a single elongated cylindrical member with mushroomed ends.

* * * * *